(12) United States Patent
Haberer et al.

(10) Patent No.: US 6,624,751 B2
(45) Date of Patent: Sep. 23, 2003

(54) METHOD FOR MONITORING AN ENTRANCE TO A HAZARDOUS AREA

(75) Inventors: Hermann Haberer, München (DE); Volker Rohbeck, Röhrmoos (DE)

(73) Assignee: Leuze Lumiflex GmbH & Co. KG, Fürstenfeldbruck (DE)

( * ) Notice: Subject to any disclaimer, the term of this patent is extended or adjusted under 35 U.S.C. 154(b) by 0 days.

(21) Appl. No.: 09/922,829

(22) Filed: Aug. 6, 2001

(65) Prior Publication Data

US 2002/0017603 A1 Feb. 14, 2002

(30) Foreign Application Priority Data

Aug. 7, 2000 (DE) .......................... 100 39 142

(51) Int. Cl.[7] .............................................. H01J 40/14
(52) U.S. Cl. ...................... 340/555; 340/556; 250/221; 361/177
(58) Field of Search ................... 340/541, 555, 340/556, 557, 5.2, 5.8, 942, 552; 348/82–85, 143–161; 382/103; 714/742; 250/221, 222 R, 559.12, 559.2, 559.4, 221.1; 361/177

(56) References Cited

U.S. PATENT DOCUMENTS

| 4,156,883 A | * | 5/1979 | Walter et al. ................ 340/556 |
| 4,249,074 A | * | 2/1981 | Zettler et al. ................ 340/541 |
| 4,249,207 A | * | 2/1981 | Harman et al. .............. 340/541 |
| 5,243,183 A | * | 9/1993 | Barron, Jr. et al. ...... 250/222.1 |
| 5,393,973 A | * | 2/1995 | Blau .......................... 250/221 |
| 6,054,927 A | * | 4/2000 | Brickell ...................... 340/552 |
| 6,418,546 B1 | * | 7/2002 | Hartl et al. ................. 714/742 |
| 2002/0017603 A1 | * | 2/2002 | Haberer et al. ............. 250/221 |

FOREIGN PATENT DOCUMENTS

DE      299 20 715 U1    3/2000

* cited by examiner

*Primary Examiner*—Brent A. Swarthout
(74) *Attorney, Agent, or Firm*—Venable, LLP; Robert Kinberg; Catherine M. Voorhees

(57) ABSTRACT

A method for monitoring an entrance to a hazardous area comprising sensing a signal pattern generated by light barriers when an object passes the entrance and comparing the sensed signed pattern with at least one predetermined signal pattern. The object is admissible if the signal patterns are identical and under certain other conditions.

11 Claims, 2 Drawing Sheets

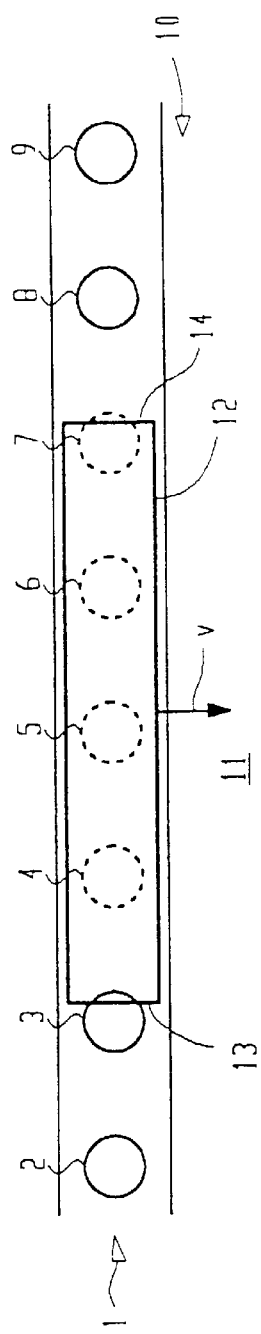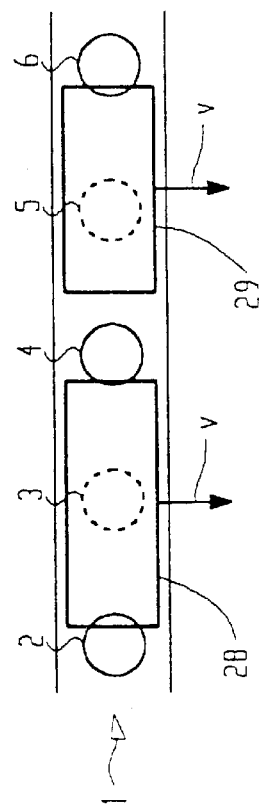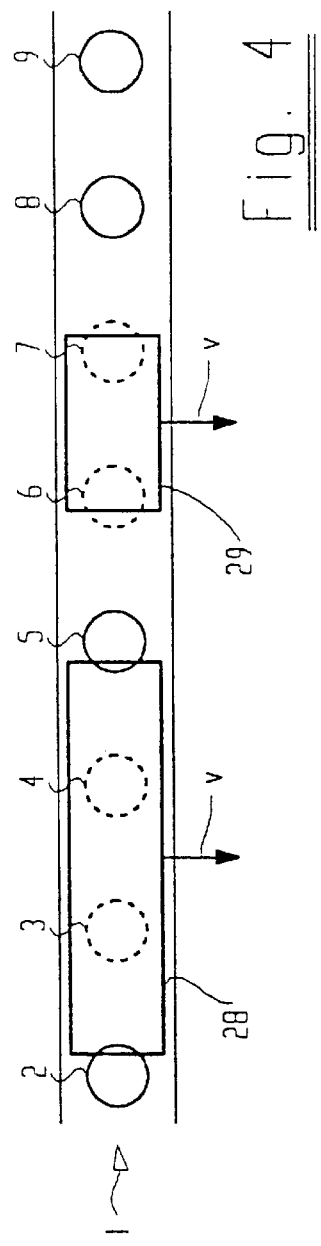

METHOD FOR MONITORING AN ENTRANCE TO A HAZARDOUS AREA

BACKGROUND OF THE INVENTION

The invention pertains to a method for monitoring an entrance to a hazardous area.

Light barriers, light curtains, light screens, etc., have been used for monitoring hazardous areas, e.g., the working area of a machine, for quite some time. The light barriers are usually arranged at entrances to the hazardous area and serve primarily for protecting persons and generally for monitoring if an object that is considered "admissible," e.g., a workpiece to be processed or a workpiece carrier, travels into the hazardous area and is properly aligned or if the object consists of an "inadmissible" object. Depending on the object shape and the object size, individual light barriers are interrupted or blanked or partially blanked when the object passes the entrance. In this case, a series of light barriers would, in principle, make it possible to realize an "object recognition" by comparing a sensed "signal pattern" with a predetermined signal pattern that is considered admissible. If the size and the position of the object, e.g., a workpiece carrier, are known, the same light beams are always blanked or partially blanked if the object is properly aligned. However, this is not always the case due to misaligned workpieces, vibrating machine components and vibrating light barrier components, scattered light, etc. This means that, in particular, "marginal beams," i.e., light beams that extend in marginal regions of an object to be scanned, are sometimes blanked more intensely than at other times.

SUMMARY OF THE INVENTION

The invention is based on the objective of disclosing a monitoring method that eliminates the aforementioned problems.

The invention is based on a comparison between a signal pattern generated by several light barriers and at least one predetermined signal pattern. In this case, the sensed signal pattern is also considered to be admissible if the signal states of light barriers, the light beams of which extend in the marginal region of an object to be scanned, deviate from the predetermined signal pattern. In simpler terms, this means that, if a marginal light beam is blanked more intensely with reference to a predetermined signal pattern, a marginal light beam that extends on the opposite side of the object needs to be blanked less intensely or be free and vice versa.

The light barriers are arranged at the entrance to a hazardous area and are interrupted, diminished by object edges, or not influenced when the object passes. This results in a "signal pattern" that depends on the size, shape and alignment of the object.

Depending on the respective application, the sensed signal pattern may deviate from the predetermined signal pattern, e.g., due to a "changed" object position, shaking of a workpiece support or movements of a workpiece to be scanned in the protected area, vibrations of the object and of components of the light barriers, etc. Consequently, the "partial blanking" of individual light beams may change and "marginal light beams," i.e., light beams that extend on object edges, may become entirely free or interrupted.

Since objects, the signal pattern of which does not exactly correspond to predetermined signal patterns, are also considered to be admissible in accordance with the invention, errors in the object recognition are reduced such that a higher "robustness" of the monitoring device is achieved and a superior utilization of the capacity of the machine to be monitored and shorter machine standstill times can be realized.

Other objects and features of the present invention will be in part apparent and in part pointed out hereinafter.

BRIEF DESCRIPTION OF THE DRAWINGS

FIG. 1 is a schematic representation of an entrance to a hazardous area;

FIG. 3 is a schematic representation for explaining reduced resolution; and

FIG. 4 is another schematic representation for explaining reduced resolution.

Corresponding reference characters indicate corresponding parts throughout the several views of the drawings.

DETAILED DESCRIPTION OF THE PREFERRED EMBODIMENT

Figure 2:
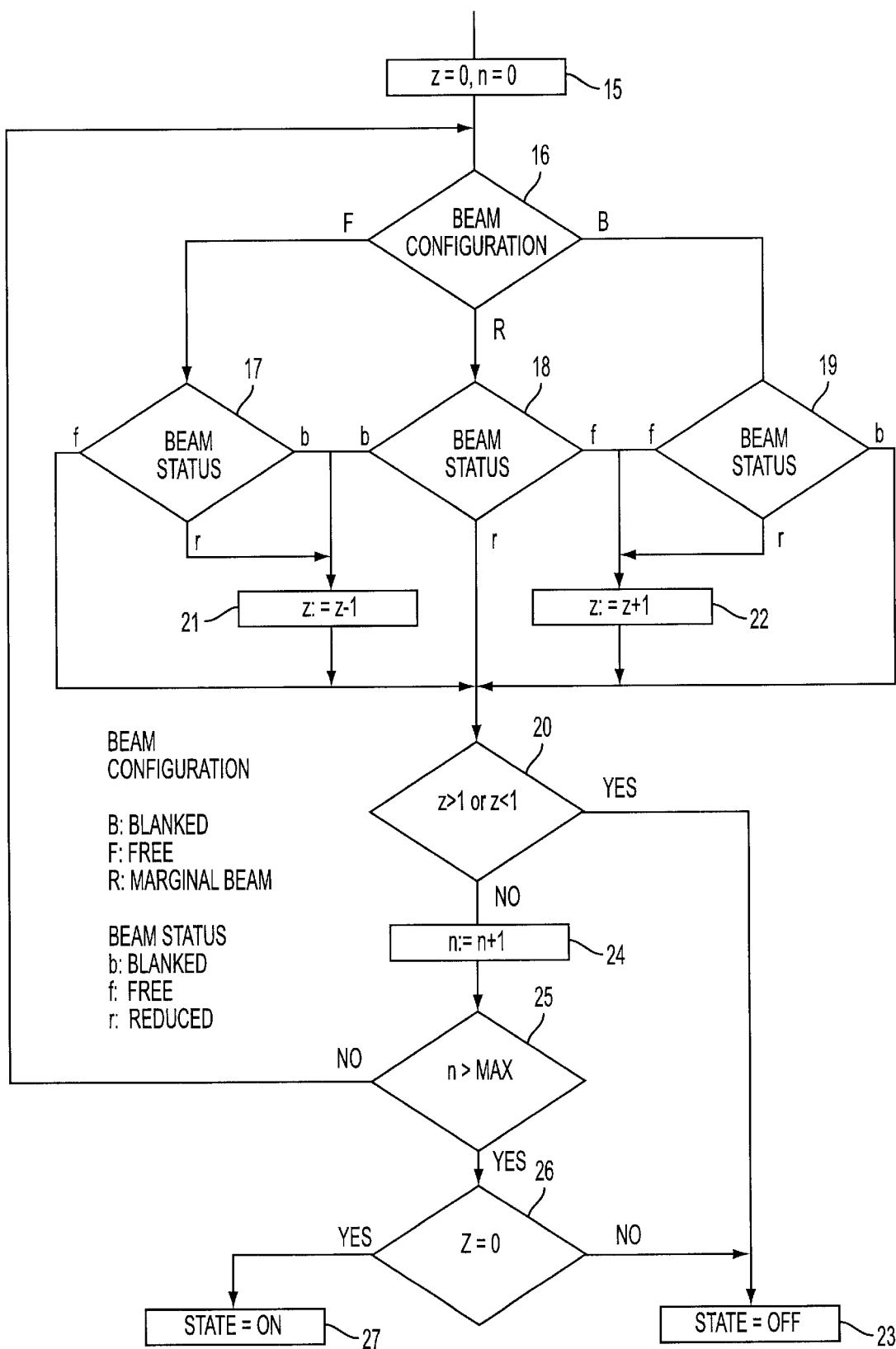
FIG. 2 is a block diagram of beam evaluation with the "fixed blanking" method.

FIG. 1 shows a light screen 1 formed by several light beams 2–9 that extend perpendicular to the plane of projection. The respective light beams 2–9 are generated by a light transmitting element (not shown) and can be received by a light receiving element (not shown). A unit consisting of a light transmitting element and a light receiving element is usually referred to as a "light barrier."

The light screen 1 is arranged at an entrance 10 to a hazardous area 11. This figure also shows an object 12 that, for example, consists of a workpiece or a tool and currently passes the light screen 1 or the entrance 10 to the hazardous area 11, with a speed v.

The light beams 2, 8 and 9 extend entirely "outside" the object 12 and consequently are not interrupted. The light beams 4, 5 and 6 are, however, entirely interrupted or blanked by the object 12 and consequently illustrated with broken lines. The light beams 3 and 7 can be referred to as "marginal light beams" because they are partially interrupted or partially blanked by the respective edges 13 and 14. One can ascertain that only a small portion of the "cross-sectional surface" of the light beam 3 is blanked by the edge 13 of the object 12. However, the light beam 7 is almost completely blanked by the object 12.

Consequently, the light receiving elements (not shown) of the individual light barriers sense a different "reception brightness" H depending on whether the respective light beam 2–9 is free, blanked or a marginal beam.

A light barrier or a "light axis" is configured in accordance with the shape, size and, if applicable, the alignment of a predetermined object 12 that is considered to be admissible by the installation of the light barrier arrangement. In this case, the reception brightness H of the respective light beam is assigned to one of three "configured statuses."

1. A light beam is considered to be a blanked light beam B if the reception brightness H lies below a lower threshold value SU, i.e., if H<SU applies.

2. A light beam is considered to be a free or non-blanked light beam F if the reception brightness H lies above an upper threshold value SO, i.e., if H>SO applies.

3. A light beam is considered to be a marginal light beam if SU<H<SO applies. The range of values SU<H<SO can be referred to as the "marginal beam range."

During the operation, the light axes may assume three "actual statuses" which correspond to the above-mentioned "configured statuses," namely:

b: blanked, H<SU f: free, H>SO r: reduced=partially blanked, SU<H<SO.

In numerous applications, it needs to be ensured that only predefined objects, e.g., certain workpieces, pass the entrance to the hazardous area on a predetermined "path" with a predetermined alignment. Individual light beams or "light axes" are configured as "blanked," "non-blanked" or marginal beams in accordance with the workpiece.

The sensed reception brightnesses H of "free" or "non-blanked" light axes and, in particular, the reception brightnesses of "marginal light beams" may deviate from the preconfigured reception brightnesses for numerous reasons, e.g., shaking of the workpiece 12 or the light barrier arrangement, positioning tolerances of workpieces, scattered light, etc. For example, the partial blanking of marginal beams may change due to a slight change in the position of a tool support or a workpiece, namely such that these marginal beams become entirely free or blanked. Since marginal light beams are partially blanked by object edges— in FIG. 1, these are the light beams 3, 7—they can either be interpreted as being free or interrupted.

With respect to "non-marginal light beams," i.e., light barriers configured to be free or blanked, the following applies:

A light axis that is configured to be "blanked" is interpreted as being interrupted and a light axis that is configured to be "free" or "non-blanked" is interpreted as being "free" if the reception brightness H lies within the marginal beam range SU<H<SO.

In other words, a certain "deviation of brightness or darkness" from the configured reception brightnesses is considered admissible.

For reasons of robustness, the so-called "active blanking" method is based on an expanded evaluation. The following applies to beams 2, 8 which are situated adjacent to and on the outside of the marginal beams 3, 7 (of FIG. 1): if one of these light axes or one of these light beams 2, 8 is partially or entirely blanked, a) at least one beam that originally was partially blanked needs to be entirely free or b) at least one blanked beam needs to be at least partially free or reduced, i.e., partially blanked, in the opposite marginal region of the object during the same passage through the beams.

Consequently, it is impossible to slide a hand or an "inadmissible object" through the light screen 1 undetected, e.g., on a workpiece support.

Different variations of the above-described monitoring method are described below.

"Fixed Blanking" Method

In the so-called "fixed blanking" method, a receiver checks whether all light beams configured to be "blanked" are actually interrupted. In other words, the number and the position of blanked light axes have a fixed configuration in the "fixed blanking" method. If deviations from the preconfigured signal pattern occur during the operation, a "receiver" switches into an "off-state" such that, for example, the object is prevented from passing the entrance to the hazardous area or a machine is switched off.

In order to practically manage marginal beams and slight changes in the position of the object to be blanked, the invention proposes a modified monitoring method that is carried out in a monitoring controller.

FIG. 2 shows a block diagram of this monitoring method. A monitoring cycle begins with an initialization step 15, in which a counting variable Z and a light axis variable n are respectively set to an initial value, in this case 0. In step 16, a preconfigured and stored beam configuration is assigned to a first light axis n=0. Depending on the shape, size and alignment of a predetermined object that is considered to be admissible, this preconfigured beam configuration may be B: blanked F: free or R: marginal beam.

Depending on which of these beam configurations is assigned to the light axis n=0, the "actual beam status" of the light axis n=0 is determined in one of steps 17–19 in accordance with the reception brightness actually sensed by the light barrier n=0. This actual beam status may differ from the preconfigured beam status due to vibrations, positioning errors, scattered light, etc. The actual beam status may be b: blanked (interrupted)

f: free or r: reduced (diminished).

The method skips to step 20 if the respective actual beam status b, f or r corresponds to the respective preconfigured beam status B, F or R. However, if the respective actual beam status b, f or r of the light axis n=0 deviates from the respective assigned and preconfigured beam status B, F or R, the counting variable Z is either decremented in step 21 or incremented in step 22.

Step 21 is processed if the beam configuration is F and the actual beam status is b or r, or if the beam configuration is R and the actual beam status is b.

Step 22 is processed if the beam configuration is B and the actual beam status is f or r, or if the beam configuration is R and the actual beam status is f.

Step 20 is subsequently processed in both instances. In step 20, whether one of the two conditions Z>+1 or Z<−1 applies is checked, i.e., if the beam status of more than one light axis deviates from the respective preconfigured beam status. If the value of Z is greater than +1 or less than −1, an "off-state" is generated in step 23, i.e., a machine to be monitored is, for example, switched off. However, if the counting variable Z has one of the values −1, 0 or +1, the light axis variable n is incremented in step 24.

In step 25, whether the light axis variable n exceeds a predetermined maximum value that corresponds to the number of light axes provided is subsequently checked. If this is not the case, this means that all n light axes provided have not yet been checked during the present monitoring cycle. Consequently, the check carried out in step 16 begins anew for the "next" light axis n=:n+1.

However, if all n light axes have already been processed, whether the counting variable is Z=0 is checked in step 26. If this is the case, an "on-state" is generated or preserved in step 27. Otherwise, an "off-state" is generated in step 23.

At the end of a cycle, all n light axes have been assigned an actual status b, f, r. This status is now checked for all n light axes in order to determine the switching condition of the "receiver." In simpler terms, whether the status corresponds to the configuration is initially determined. If this is not the case, the counting variable Z that is initializing with 0 is a) decremented if the light axis is darker than expected or b) incremented if the light axis is brighter than expected.

Beams that are configured to be "free" and were partially blanked during the current cycle, as well as light beams that are configured to be marginal beams and were entirely free, consequently need to be compensated on "the other side" of the object, e.g., on the other side of the workpiece or workpiece support, by marginal beams that are now entirely blanked or by partially blanked light beams that are configured to be "free" beams. In this case, no more than one light axis may assume a status that deviates from the configuration. This is checked in step 20(Z>+1 or Z<−1).

"Floating Blanking" Method

The "floating blanking" method makes it possible to blank a certain number of light beams, e.g., one or no more than two light beams that are able to move within the protected area, at one location of the protected area of the light barrier arrangement. In other words, only the number of interrupted light beams is checked in the floating blanking method. A check with respect to which of the light barriers provided are interrupted or not interrupted is not carried out. In the floating blanking method, different operating modes that can be selected with configuration software may be realized.

1. The receiver evaluates the interrupted light axes and only switches into the
    a) on-state if the number of interrupted axes is greater than 0, but smaller or equal to the configured number of floating blanked beams or into the
    b) off-state if all floating blanked beams become free.

One possible application of this operating mode is the blanking of a workpiece in a folding press.

2. The receiver monitors the interrupted light axes and switches into the
    a) on-state if the number of interrupted light axes does not exceed the maximum configured number, wherein the number of floating blanked light axes may be interrupted, but does not necessarily have to be interrupted, or into the
    b) off-state if the floating blanked beams became free and were interrupted anew before a reset signal or "clear" signal was received.

One possible application of this operating mode is the blanking of a workpiece in a series production machine.

In addition, it is possible to utilize a so-called "muting sensory mechanism" for activating the floating blanking method in devices with so-called "muting extensions." A so-called "muting sensory mechanism" is described, for example, in DE-GM 299 20 715.3 and used in certain applications for differentiating between admissible and inadmissible objects. If an admissible object is detected, the muting sensors generate a "suppression signal" which causes the switch-off function to be temporarily deactivated despite an interruption of individual light barriers, i.e., the machine to be monitored is not switched off because, for example, a workpiece that is considered to be admissible currently passes the entrance to the hazardous area.

An activation/deactivation delay that, for example, can be realized with the aid of a PC and has a predetermined value of one second makes it possible to arrange the "muting sensory mechanism" at a distance from the light curtain while still being able to configure a "monitored beam blanking." Signal lamps which indicate the muting mode of a muting sensory mechanism may be used for signaling that floating blanking is active. Consequently, "floating blanking" cannot be activated simultaneously with muting in this case.

In master/slave applications, it is possible, e.g., with the aid of a configuration PC, to adjust the system such that floating blanking is only effective in the master or in certain slaves.

Reduced Resolution

A "reduced resolution" serves for reliably not detecting small objects, i.e., objects with a certain maximum size, in order to tolerate, for example, objects that occasionally protrude into the protected area. Naturally, the previously described monitoring method for evaluating marginal beams according to the invention can also be used in connection with "reduced resolution." At "reduced resolution," the receiver can be adjusted by means of a configuration device, e.g., a PC, such that only each second or each third light beam forms part of the protected area. In contrast to the previously described "fixed blanking" method, the active light axes are, however, able to freely move in the protected area.

FIG. 3 shows a region of a protected area, the resolution of which is reduced by a factor of 2.

This figure shows two objects 28, 29 that pass the light screen 1 with a speed v. The light beams 3 and 5 are entirely interrupted by the objects 28 and 29, respectively. However, the light beams 2, 4 and 6 represent marginal light beams, i.e., they are only partially interrupted by the objects 28, 29 and consequently have a reduced reception brightness H. In other words, the light beams 2, 4 and 6 which are situated directly adjacent to the interrupted light beams 3 and 5 are free if the resolution is reduced by a factor of 2 or have an at least diminished reception brightness (marginal light beam).

FIG. 4 shows a region of a protected area with a resolution that is reduced by a factor of 3. In this case, the object 28 entirely interrupts the light beams 3 and 4 and partially interrupts the light beams 2 and 5. However, the object 29 interrupts each of the two adjacent light beams 6 and 7 partially. This means that, if the resolution is reduced by a factor of 3, either the directly adjacent preceding light axis and the second ensuing light axis or the second preceding light axis and the directly adjacent ensuing light axis need to be free. The receiver switches into the off-state if one of these conditions is not fulfilled.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method for monitoring an entrance of a hazardous area with the aid of a light grid arrangement comprising light barriers, said method comprising the following steps:
    a) recording actual received brightness values H of an individual light beam associated with a respective light barrier;
    b) deriving a signal pattern from the received brightness values H by comparing the actual received brightness values with an upper threshold value SO and a lower threshold value SU, wherein the received brightness values H are assigned to the following signal states:
    "free" H>SO
    "blanked" H<SU
    "partially blanked" SU<H<SO
    and wherein the individual signal states of the light beams form the derived signal pattern;
    c) comparing the derived actual signal pattern to a predetermined signal pattern of an object that is considered permissible to enter the hazardous area; and d) determining the object as a permissible object if one of the derived signal pattern coincides with the predetermined signal pattern, and an actual signal state "partially blanked" or "blanked" is obtained in place of a predetermined signal state "free" or "partially blanked" for a light beam in the region of a first edge of the object, an actual signal state "blanked" or "free" is obtained for a light beam in a region of a second edge of the object in place of the predetermined signal state "blanked" or "partially blanked" and the remaining signal states of the derived signal pattern coincide with the signal states of the predetermined signal pattern.

2. The method according to claim 1, wherein each light barrier is configured as free, blanked or partially blanked according to a predetermined reception brightness in dependence on the size and shape or the alignment of a predetermined admissible object, wherein the reception brightness H of a blanked light barrier lies below a predetermined lower threshold value SU, the reception brightness of a free light barrier lies above a predetermined upper limiting value SO and the reception brightness of a partially blanked light barrier lies between the upper and the lower limiting value.

3. The method according to claim 2 wherein one of said light barriers which is configured to be interrupted is also interpreted as being blanked and another of said light barrier which is configured to be free is also interpreted as being free if the actual reception brightness of the light barriers lies between the lower limiting value and the upper limiting value.

4. The method according to claim 1 wherein the object is only considered to be admissible if statuses of all light beams of the sensed signal pattern which extend inside and outside the marginal region of the object correspond to those of the predetermined signal pattern.

5. The method according to claim 4 wherein actual beam statuses of the respective light barriers are successively compared with an assigned, preconfigured beam status during a monitoring cycle, wherein a counter is decremented if the reception brightness of a light barrier is lower than an assigned, configured reception brightness of a light barrier is greater than an assigned, configured reception brightness, and wherein an off-signal is generated if the beam status of more than one light barrier deviates from the configured beam status during the monitoring cycle or if the counter has a value that deviates from an initial count at the end of the monitoring cycle after all light barriers are checked.

6. The method according to claim 1 wherein a predetermined number of said light bafflers is configured to be blanked or free, and only a number of actually blanked or free light barriers is compared with a configured number.

7. The method according to claim 6 wherein an on-signal is generated if a number of blanked light barriers is greater than zero and less than or equal to the configured number of interrupted light barriers, and an off-signal is generated if all light barriers are free.

8. The method according to claim 6 wherein an on-signal is generated if the number of blanked light beams is less than a predetermined number, and an off-signal is generated if light barriers are blanked, subsequently become free again and are then blanked anew without an operator having generated a restart signal.

9. The method according to claim 1 wherein a protected area formed by the light barriers has a predetermined object resolution, wherein it can be predetermined that an object to be identified blanks or partially blanks a predetermined minimum number of light barriers.

10. The method according to claim 1 wherein a series of light barriers are arranged parallel to one another.

11. The method according to claim 1 wherein a series of light barriers are arranged in the shape of a light screen.

* * * * *